(12) United States Patent
Li et al.

(10) Patent No.: US 10,649,104 B2
(45) Date of Patent: May 12, 2020

(54) METHODS AND APPARATUSES FOR RECONSTRUCTING INCIDENT ENERGY SPECTRUM FOR A DETECTOR

(71) Applicants: Tsinghua University, Daidian District, Beijing (CN); NUCTECH COMPANY LIMITED, Haidian District, Beijing (CN)

(72) Inventors: Liang Li, Beijing (CN); Zhiqiang Chen, Beijing (CN); Li Zhang, Beijing (CN); Ziran Zhao, Beijing (CN); Yuxiang Xing, Beijing (CN); Kejun Kang, Beijing (CN); Lan Zhang, Beijing (CN); Ruizhe Li, Beijing (CN)

(73) Assignees: Tsinghua University, Daidian District, Beijing (CN); Nuctech Company Limited, Haidian District, Beijing (CN)

( * ) Notice: Subject to any disclaimer, the term of this patent is extended or adjusted under 35 U.S.C. 154(b) by 345 days.

(21) Appl. No.: 15/597,003

(22) Filed: May 16, 2017

(65) Prior Publication Data
US 2018/0038970 A1  Feb. 8, 2018

(30) Foreign Application Priority Data

Aug. 5, 2016 (CN) .......................... 2016 1 0638429

(51) Int. Cl.
| | |
|---|---|
| *G01T 1/36* | (2006.01) |
| *G01N 23/223* | (2006.01) |
| *G01T 7/00* | (2006.01) |

(52) U.S. Cl.
CPC .......... *G01T 7/005* (2013.01); *G01N 23/223* (2013.01); *G01N 2223/076* (2013.01); *G01N 2223/303* (2013.01)

(58) Field of Classification Search
CPC ......... A61B 6/032; A61B 6/482; A61B 6/583; G01N 23/046; G01N 2223/076;
(Continued)

(56) References Cited

U.S. PATENT DOCUMENTS

| | | | |
|---|---|---|---|
| 9,952,165 B2 * | 4/2018 | Hansford | ............. G01N 23/223 |
| 2011/0121163 A1 | 5/2011 | Kang et al. | |

(Continued)

FOREIGN PATENT DOCUMENTS

| | | |
|---|---|---|
| CN | 103853929 A | 6/2014 |
| EP | 2932902 A1 | 10/2015 |

(Continued)

OTHER PUBLICATIONS

Japanese Office Action for Application No. 2017-106309, dated Mar. 13, 2018 in 7 pages.
Cliff et al., "The Quantitative Analysis of Thin Specimens", Journal of Microscopy, Wiley, Mar. 1975, vol. 3, Issue 2, pp. 203-207 in 5 pages.
(Continued)

*Primary Examiner* — Irakli Kiknadze
(74) *Attorney, Agent, or Firm* — Knobbe, Martens, Olson & Bear, LLP

(57) ABSTRACT

A method and apparatus for reconstructing an incident energy spectrum for a detector are disclosed. In this method, an object to be inspected is illuminated with rays, and then rays transmitted through the object to be inspected are received by the detector to convert the received rays into data of a detected energy spectrum. The incident energy spectrum for the detector is reconstructed based on the data of the energy spectrum using a statistical iterative algorithm with a pre-established detector response function. With the above solution of the embodiments, the incident energy spectrum for the detector can be more accurately acquired, thereby reducing a distortion of the incident energy spectrum caused by the detector.

9 Claims, 6 Drawing Sheets

(58) Field of Classification Search
CPC ........... G01N 2223/303; G01N 23/223; G01N 23/20091; G01N 23/203; G01N 2223/3032; G01N 2223/309; G01N 2223/313; G01N 2223/401; G01N 2223/418; G01N 2223/419; G01T 1/36; G01T 7/005
USPC ......................................................... 378/44
See application file for complete search history.

(56) References Cited

U.S. PATENT DOCUMENTS

| | | | |
|---|---|---|---|
| 2016/0070008 A1 | 3/2016 | Cao et al. | |
| 2016/0095561 A1* | 4/2016 | Tamura | A61B 6/032 378/62 |
| 2016/0290846 A1 | 10/2016 | Chazal et al. | |
| 2019/0078916 A1 | 3/2019 | Chazal et al. | |

FOREIGN PATENT DOCUMENTS

| | | | |
|---|---|---|---|
| JP | 52-104982 A | 9/1977 | |
| JP | 61-112950 A | 5/1986 | |
| JP | 63-171387 A | 7/1988 | |
| JP | 06-174663 A | 6/1994 | |
| JP | 6-174665 A | 6/1994 | |
| JP | 11-094777 A | 4/1999 | |
| JP | 11-174005 A | 7/1999 | |
| JP | 2008-256698 A | 10/2008 | |
| JP | 2011-089901 A | 5/2011 | |
| JP | 2012-512396 A | 5/2012 | |
| JP | 2014-190839 A | 10/2014 | |
| JP | 2015-160135 A | 9/2015 | |
| WO | 2014/188186 A1 | 11/2014 | |
| WO | 2015070008 A1 | 5/2015 | |

OTHER PUBLICATIONS

Combined Search and Examination Report for Application No. GB1707858.5 dated Nov. 7, 2017 in 7 pages.
Physical in Medicine and Biology (2017), vol. 62, Ruizhe et al., "Spectrum reconstruction method based on the detector response model calibrated by x-ray fluorescense", pp. 1032-1045.
Nuclear Instruments & Methods in Physics Research A (2016), vol. 820, Dufan et al., "A hybrid Monte Carlo model for energy response functions of X-ray photon counting detectors", pp. 397-406.
Nuclear Instruments & Methods in Physics Research A (2009), vol. 605, Sun et al., "End-to-end spectrum reconstruction method for analyzing Compton gamma-ray beams", pp. 312-317.
Nuclear Instruments & Methods in Physics Research A (2010), vol. 619, Kluson & Jansky, "Calculation of responses and analysis of experimental data for a silicon gamma spectrometer", pp. 186-189.
Chinese Patent Office Action for Application No. 201610638429.2, dated Jan. 23, 2019 in 10 pages.
Michel, Thilo et al., "Nuclear Instruments and Methods in Physics Research Section A: Accelerators, Spectrometers, Detectors and Associated Equipment", Elsevier, vol. 598, Issue 2, Jan. 11, 2009, pp. 510-514.
Wang, Zhentian et al., "Overview of Statistical Reconstruction Algorithms", CT Theory and Applicants, vol. 16, No. 4, Dec. 2007, in 15 pages.
Li, Zhe et al., "Si-PIN Detector Response Function Model and Its Applications in EDXRF Technology", Technology Report, vol. 31, pp. 35-38.
Li, Zhe et al., "Method for Establishing Detector Response Function in X-ray", Fluorescence and Spectrum Analysis, vol. 32, No. 11, pp. 3112-3116, Nov. 2012.
Sukovic, Predrag et al., "Penalized Weighted Least-Squares Image Reconstruction for Dual Energy X-Ray Transmission Tomography", IEEE Transactions on Medical Imaging, vol. 19, No. 11, pp. 1075-1081, Nov. 2000.

* cited by examiner

METHODS AND APPARATUSES FOR RECONSTRUCTING INCIDENT ENERGY SPECTRUM FOR A DETECTOR

TECHNICAL FIELD

The present application relates to radiation imaging, and more particularly, to methods and apparatuses for reconstructing an incident energy spectrum (for example, an energy spectrum of X rays/gamma rays) for a detector.

BACKGROUND

For numerous applications of X/γ rays, including dual energy/multi-energy CT and radiotherapy, it is an important requirement and prerequisite for these applications to acquire accurate energy spectrum information. Theoretically, an energy spectrum can be acquired by threshold scanning with a detector. A process of acquiring the energy spectrum may be briefly described as follows: (1) defining minimum energy of photons counted by the detector through a voltage value set by a digital-to-analog converter, to count incident photons with energy above the minimum energy; (2) consecutively changing the set voltage value, to acquire photon information corresponding to a plurality of energy thresholds; (3) differentiating data of the photon information, to acquire relative photon information between two adjacent energy thresholds of various energy thresholds, i.e., the energy spectrum. However, in practice, the energy spectrum acquired in the above process is seriously distorted as a response of the detector to the incident photons is not ideal. For different types of detectors, responses of the detectors to photons have different characteristics. For example, for a cadmium-telluride-cadmium/cadmium telluride detector, which is commonly used as a detector for counting photons, a distortion of a response of the detector to incident photons is mainly caused by a charge sharing effect, an escape phenomenon, a crosstalk phenomenon etc. Under the combined action of these effects, it is difficult to acquire an energy spectrum without distortion in practical applications.

In order to solve this problem, in an existing method, an estimated energy spectrum is acquired by implementing fine-tuning on an empirical equation using experimental data. In another existing method, the Monte Carlo method is used to implement fine modeling on a detection system, simulate a process of acquiring an energy spectrum, and estimate an actual energy spectrum according to a result of the simulation. However, the methods for estimating an energy spectrum either have limited accuracy or require complex modeling, and thus are subject to various limitations in practical use.

SUMMARY

In view of one or more of the problems in the prior art, there is proposed a method and apparatus for reconstructing an incident energy spectrum for a detector.

According to an aspect of the present disclosure, there is proposed a method for reconstructing an incident energy spectrum for a detector, comprising steps of: illuminating an object to be inspected with rays; receiving, by the detector, rays transmitted through the object to be inspected to acquire data of a detected energy spectrum; and reconstructing the incident energy spectrum for the detector based on the data of the energy spectrum using a statistical iterative algorithm with a detector response function.

According to some embodiments, before the step of reconstructing the incident energy spectrum for the detector based on the data of the energy spectrum using a statistical iterative algorithm with a detector response function, the method further comprises: calibrating parameters of the detector response function by collecting energy spectrums of X-ray fluorescence generated by different target materials in a plurality of energy segments.

According to some embodiments, the detector response function comprises a Gaussian peak portion and a baseline portion which is a function of the Gaussian peak portion.

According to some embodiments, the detector response function is weighted using a weighting parameter which is fitted using a quadratic function and depends on energy of the detected energy spectrum.

According to some embodiments, the detector response function further comprises a characteristic peak portion and an escape peak portion of the detector.

According to some embodiments, the incident energy spectrum is iteratively reconstructed based on the following equation:

$$S_j^{n+1} = \frac{S_j^n}{\sum\limits_{i=1} R_{ij}} \sum\limits_{i=1} \frac{R_{ij} D_i}{\sum\limits_{k=1} R_{ik} S_k^n},$$

wherein $D_i$ represents the data of the detected energy spectrum, $R_{ij}$ represents a matrix representation of the detector response function, $S_j$ represents the reconstructed incident energy spectrum for the detector, and n is a number of iterations.

According to some embodiments, the baseline portion is an integral of the Gaussian peak portion.

According to another aspect of the present disclosure, there is proposed an apparatus for reconstructing an incident energy spectrum for a detector, comprising:

a ray source configured to generate rays to illuminate an object to be inspected;

a detector configured to receive rays transmitted through the object to be inspected to acquire data of a detected energy spectrum; and a data processing device configured to reconstruct the incident energy spectrum for the detector based on the data of the energy spectrum using a statistical iterative algorithm with a detector response function.

According to some embodiments, the data processing device is further configured to calibrate parameters of the detector response function by collecting energy spectrums of X-ray fluorescence generated by different target materials in a plurality of energy segments.

With the above solutions of the embodiments, the energy spectrum detected by the detector can be more accurately reconstructed, thereby reducing a distortion of the incident energy spectrum caused by the detector.

BRIEF DESCRIPTION OF THE DRAWINGS

For a better understanding of the present disclosure, the present disclosure will be described in detail with reference to the following drawings.

DETAILED DESCRIPTION

Specific embodiments of the present disclosure will be described in detail below. It should be noted that the embodiments described herein are used for illustration only, without limiting the present disclosure. In the description below, a number of specific details are explained to provide thorough understanding of the present disclosure. However, it is apparent to those skilled in the art that the present disclosure can be implemented without these specific details. In other instances, well known circuits, materials or methods are not described specifically so as not to obscure the present disclosure.

There is a serious distortion in an energy spectrum of rays acquired by a detector under the action of multiple effects. Therefore, for a variety of X/γ rays dependent on energy spectrum information, the accuracy of the acquired energy spectrums of the rays will be seriously influenced. The existing energy spectrum estimation method is limited by many factors in terms of practicality and accuracy. In view of the problem of a distortion of an incident energy spectrum for a detector in the prior art, the embodiments of the present disclosure propose to establish a finer detector response function and reconstruct an energy spectrum incident onto a detector from values of an energy spectrum detected by the detector on the basis of this function, thereby eliminating the distortion of the energy spectrum caused by the detector.

For incident photons with certain energy, an output of the detector has a probability distribution on an energy axis of an energy spectrum. The distortion of the incident energy spectrum in the detection process can be described as a process in which the incident energy spectrum interacts with an energy response function of the detector as follows:

$$D(E_D) = \int R(E_D, E_S) S(E_S) dE_S \quad (1)$$

wherein $E_S$ and $E_D$ are energy of the incident energy spectrum and energy of the detected energy spectrum, respectively; $S(E_S)$ and $D(E_D)$ are the incident energy spectrum and the detected energy spectrum, respectively; and $R(E_D, E_S)$ is the energy response function of the detector, which is also called a response model.

Figure 1:
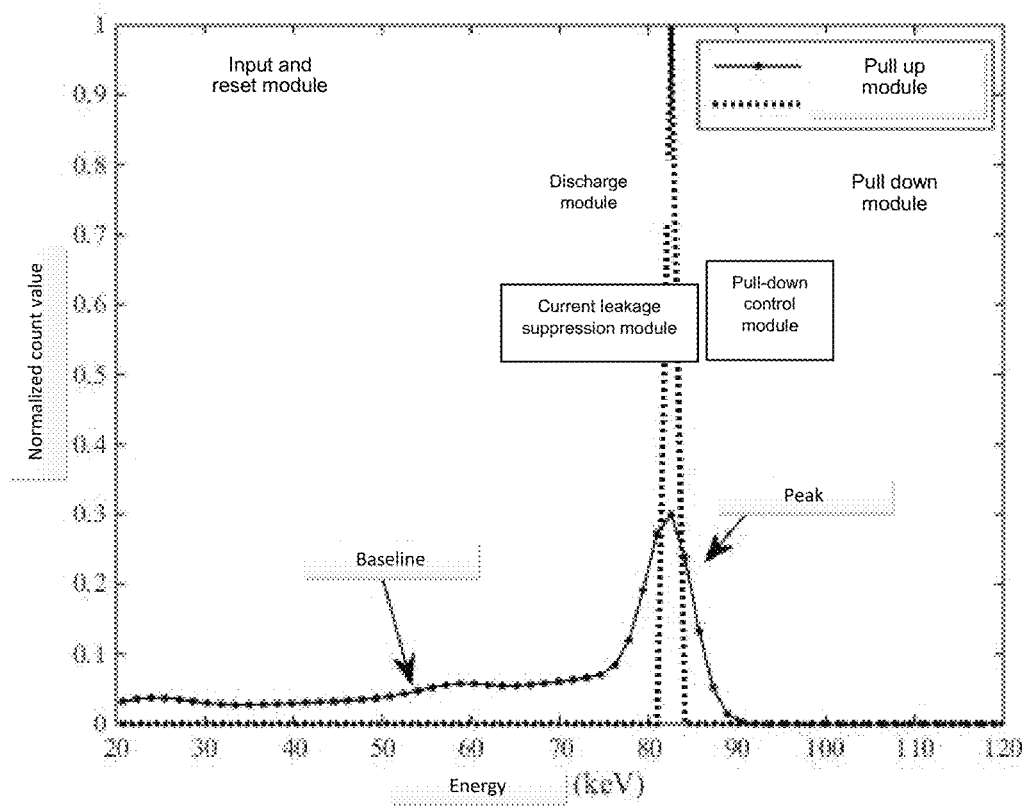
FIG. 1 illustrates a graph of a response of a typical detector to single-energy photons.

As shown in FIG. 1, a detector response for single-energy photons may be divided into two portions, which are a Gaussian peak portion and a baseline portion. Within an energy range of interest, an XRF energy spectrum of each material may be approximately considered to have two types of single-energy rays each with respective energy, which are $K_\alpha$ rays and $K_\beta$ rays, respectively, and subsequently response functions for the single-energy rays are established and are then combined into an XRF response function.

Due to the influence of stochastic effects, a count of rays with energy E in the energy spectrum shows a probability distribution, which may be described using a function with a Gaussian peak:

$$G(E_D, E) = \frac{1}{\sqrt{2\pi}\,\sigma(E)} \exp\left(-\frac{(E_D - E)^2}{2\sigma(E)^2}\right) \quad (2)$$

wherein $\sigma(E)$ is a standard deviation, and is approximated as a linear representation of the incident energy:

$$\sigma(E) = c_1 + c_2 E \quad (3)$$

wherein $E_D$ is energy of an actually detected energy spectrum, and $c_1$ and $c_2$ are constant parameters.

On the basis of the above Gaussian peak, a main part of a baseline (i.e. a baseline portion) may be described as an integral of the Gaussian peak, as a count of the baseline portion is generated under a distortion effect of photons at the Gaussian peak. As the influence of the distortion effect on the energy spectrum near the Gaussian peak is large, and its influence on the energy spectrum decreases gradually away from the Gaussian peak, a weighting parameter which varies with $E_D$ is also required:

$$R_{erfc}(E_D, E) = w(E_D, E) \cdot \int_{E_D}^{\infty} \frac{1}{\sqrt{2\pi}\,\sigma(E)} \exp\left(-\frac{(E_D - E)^2}{2\sigma(E)^2}\right) dE \quad (4)$$

wherein the weighting parameter is fitted using a quadratic function:

$$w(E_D, E) = c_3 E_D^2 + c_4 E_D + (c_5 E + 1) \quad (5)$$

wherein $c_3$, $c_4$ and $c_5$ in the above equation are constant parameters.

Based on characteristics of different crystal materials of detectors, influences of a characteristic peak and an escape peak may be considered in the response function for a detector with an escape phenomenon. Taking a tellurium-zinc-cadmium detector as an example, a characteristic peak and an escape peak may be respectively described as:

$$\begin{cases} R_{DXRF}(E_D) = G(E_D, E_{Cd}) + c_6 G(E_D, E_{Te}) \\ R_{escape}(E_D, E) = G(E_D, E - E_{Cd}) + c_6 G(E_D, E - E_{Te}) \end{cases} \quad (6)$$

wherein $E_{Cd}$ and $E_{Te}$ are XRF energy (which is approximated with $K_\alpha$ energy) for cadmium and tellurium, respectively, and $c_6$ is a constant parameter.

Then, responses of $K_\alpha$ and $K_\beta$ peaks are written and given with a weight respectively, and the XRF response may be written as:

$$R_{XRF}(E_D, E_{K_\alpha}, E_{K_\beta}) = (c_7 + c_8 E_{K_\alpha}) \cdot (R_{Peak}(E_D, E_{K_\alpha}) + c_9 R_{Peak}(E_D, E_{K_\beta})) \quad (7)$$

wherein a function of the single-energy peak is:

$$R_{peak}(E_D, E) = G(E_D, E) + c_{10} R_{erfc}(E_D, E) + c_{11} R_{DXRF}(E_D) + c_{12} R_{escape}(E_D, E) \quad (8)$$

wherein $(c_7+c_8E_{K_\alpha})$ is an intensity parameter used for fitting, which is convenient to fit experimental data, and $c_7$, $c_8$, $c_9$, $c_{10}$, $c_{11}$ and $c_{12}$ are constant parameters. In this way, after fitting the data using several materials which generate XRF, a desired single-energy response equation can be acquired from the data:

$$R(E_D,E)=R_{Peak}(E_D,E) \tag{9}$$

Figure 6:
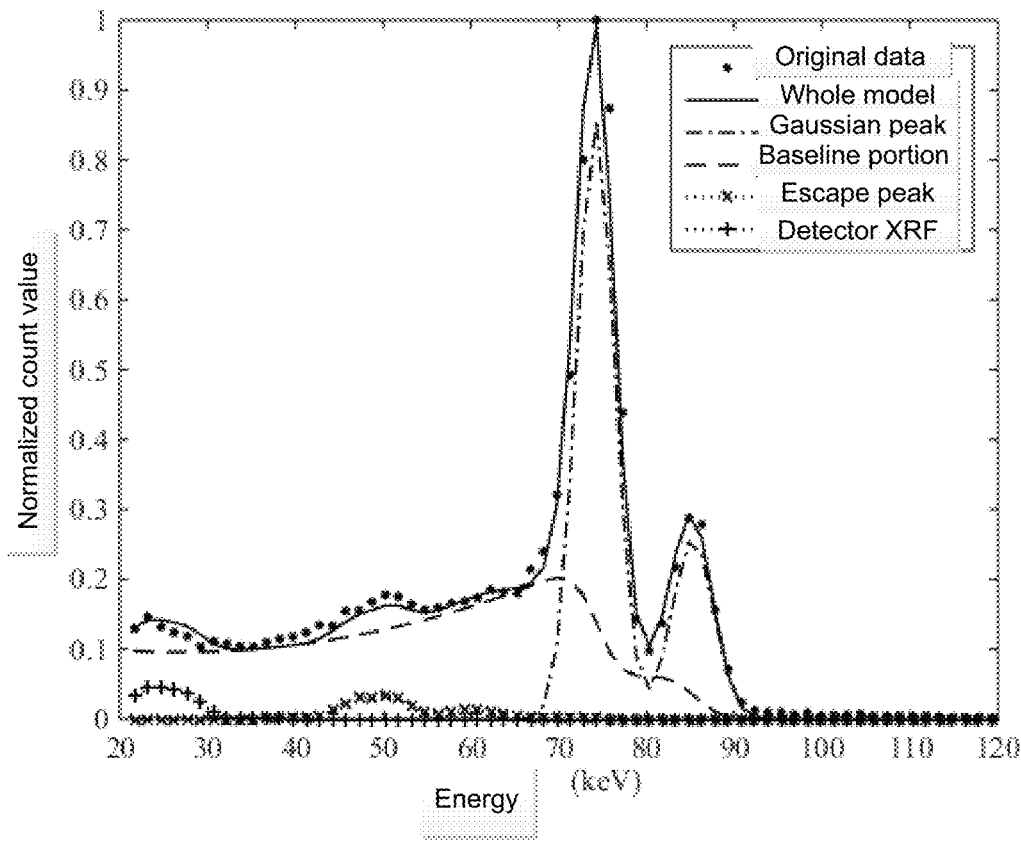
FIG. 6 is a graph illustrating a typical XRF energy spectrum response function.

In experiments, in order to acquire meaningful intensity information, a number of photons in an experimental energy spectrum which have energy in an energy range [E/2,∞] is counted as intensity of the incident energy spectrum. This is because photons with energy below the energy range are generated under the distortion effect, and if these photons are not removed in the counting process, the incident photons influenced by the distortion effect may be repeatedly counted, which results in wrong intensity. FIG. 6 illustrates a graph of a typical XRF energy spectrum response function.

Figure 2:
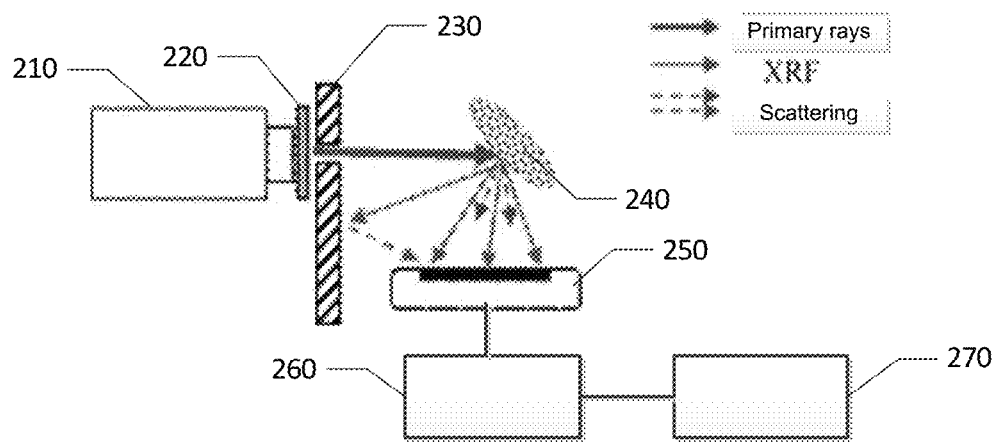
FIG. 2 illustrates a structural diagram of a detector for calibrating a detector response function according to an embodiment of the present disclosure.

FIG. 2 illustrates a structural diagram of a device for calibrating a detector response function according to an embodiment of the present disclosure. The device shown in FIG. 2 includes a radiation source 210, a filter plate 220, a collimator 230, a target 240, a detector 250, a data collection apparatus 260, and a data processing device 270.

Figure 3:
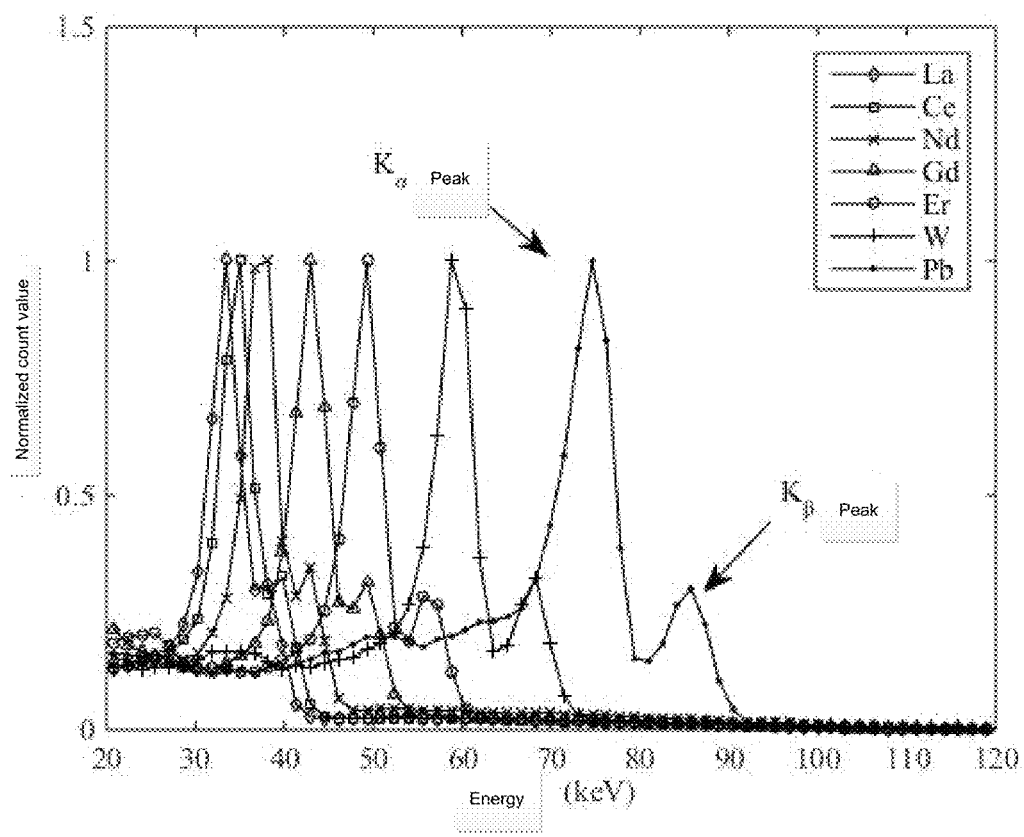
FIG. 3 illustrates an exemplary graph of XRF energy spectrums for calibrating a function according to an embodiment of the present disclosure.

Primary X rays are generated by the radiation source 210 such as an X-ray tube. As photons in the X-ray energy spectrum with energy below the desired XRF energy are not only unable to excite the XRF, but also increase scattering, the primary rays are hardened by the filter plate 220. The primary rays are shielded and collimated using a perforated plate with a heavy metal material such as a lead plate as the collimator 230. The primary X rays excite the target 240 to emit XRF to be collected by the detector 250 which is placed in parallel to the primary rays. The data collection apparatus 260 collects XRF energy spectrums of a number of different materials in an energy segment of interest and then the above function is calibrated by the data processing device 270, such as a computer. FIG. 3 is an exemplary graph illustrating a result of collection of XRF energy spectrums according to an embodiment of the present disclosure. After a desired number of XRF energy spectrums are collected, theoretical peak positions respectively corresponding to the acquired XRF energy spectrums as independent variables and a position and intensity of each point on the energy spectrums as dependent variables are substituted into the equation (7) and parameters in the equation (7) are fitted using the least square algorithm. Then, a number of photons in the energy spectrums is counted, and intensity of the incident energy spectrums is calculated using the method described above to normalize the intensity of the function. Based on the degree of discretization required to reconstruct the energy spectrum, a matrix representation of the detector response function required for the iterative reconstruction of the energy spectrum can be calculated based on the calibrated function, and the matrix can be used for subsequent reconstruction steps.

Figure 4:
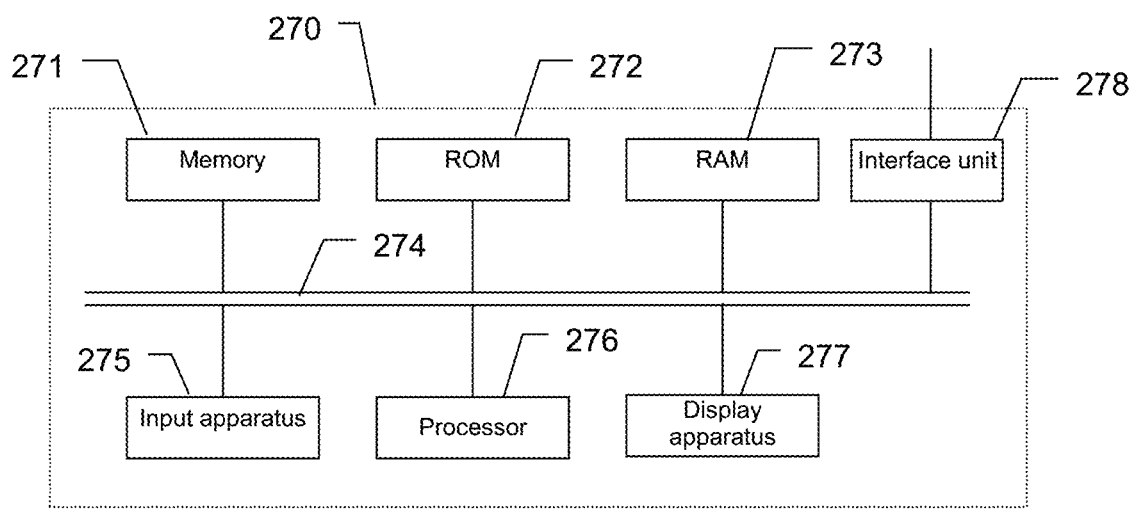
FIG. 4 illustrates a structural diagram of a data processing device shown in FIG. 2.

FIG. 4 illustrates a structural diagram of a data processing device shown in FIG. 2. As shown in FIG. 2, data acquired by the data collection apparatus 260 is stored in a memory 271 through an interface unit 278 and a bus 274. A Read Only Memory (ROM) 272 stores configuration information and programs of a computer data processor. A Random Access Memory (RAM) 273 is used to temporarily store various data during operation of a processor 276. In addition, the memory 271 also stores a computer program for data processing. The internal bus 274 is connected to the memory 271, the read only memory 272, the random access memory 273, an input apparatus 275, the processor 276, a display apparatus 277, and the interface unit 278.

After a user inputs an operation command through the input apparatus 275 such as a keyboard and a mouse, the processor 276 executes instruction codes of the computer program to acquire a calibration result. After the data processing result is acquired, a detector response function represented by a matrix is output, and is stored on an external storage device, or a processing result is output in other forms.

For example, the ray source 210 may be an X-ray tube or a high-energy X-ray accelerator etc. For example, the detector 150 may be a gas detector, a scintillator detector, or a solid detector etc. depending on its material, or may be in a form of a single row, double rows or multiple rows, or may be a single-layer detector or a dual-layer high/low energy detector etc. depending on its array arrangement.

Figure 5:
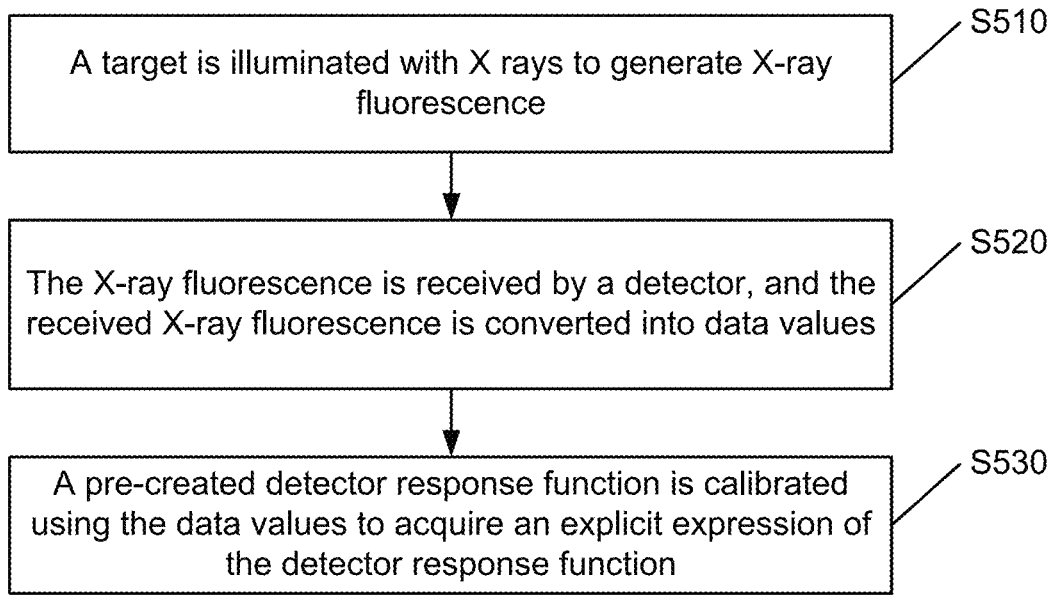
FIG. 5 illustrates a flowchart of a method for calibrating a detector response function according to an embodiment of the present disclosure.

FIG. 5 illustrates a flowchart of a method for calibrating a detector response function according to an embodiment of the present disclosure. As shown in FIG. 5, in step S510, the X-ray source 210 is operated to emit X rays, which are harden and collimated to illuminate the target 240 to generate X-ray fluorescence.

In step S520, the X-ray fluorescence is received by a detector, and the received X-ray fluorescence is converted into a data value. For example, the X-ray fluorescence is incident onto the detector 250, is converted into an electrical signal, and is then converted into a data signal by the data collection apparatus 260, that is, data values of an energy spectrum of the detected X-ray fluorescence. In this way, the data collection apparatus 260 collects XRF energy spectrums of a number of different materials in an energy segment of interest.

In step S530, the detector function is calibrated using the above data values to acquire an explicit representation of the detector response function. For example, after a desired number of XRF energy spectrums are collected completely, theoretical peak positions respectively corresponding to the acquired XRF energy spectrums as independent variables and a position and intensity of each point on the energy spectrums as dependent variables are substituted into the equation (7) and parameters in the equation (7) are fitted using the least square algorithm. Then, a number of photons in the energy spectrums are counted, and intensity of the incident energy spectrum is calculated using the method described above to normalize the intensity of the function. Based on the degree of discretization required to reconstruct the energy spectrum, a matrix representation of the detector response function required for the iterative reconstruction of the energy spectrums can be calculated based on the calibrated function, and the matrix can be used for subsequent reconstruction steps. After acquiring the explicit representation of the detector response function, the detected energy spectrum can be reconstructed as the energy spectrum of the X rays incident onto the detector using the response function.

Figure 7A:
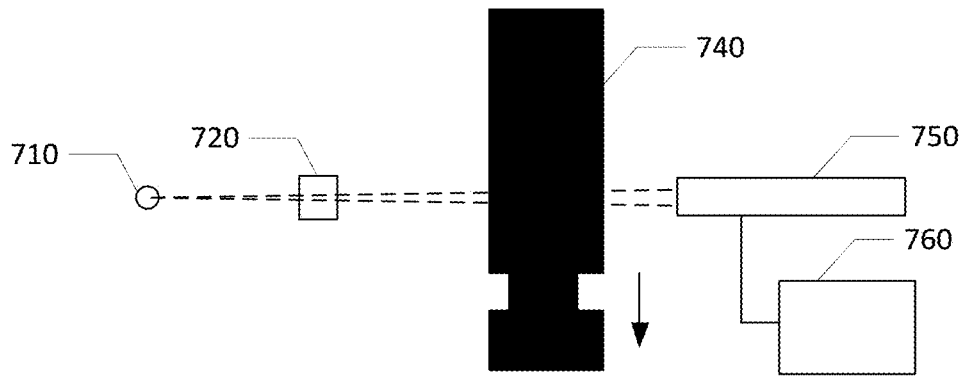
FIGS. 7A and 7B are structural diagrams of an inspection system according to an embodiment of the present disclosure.
Figure 7B:
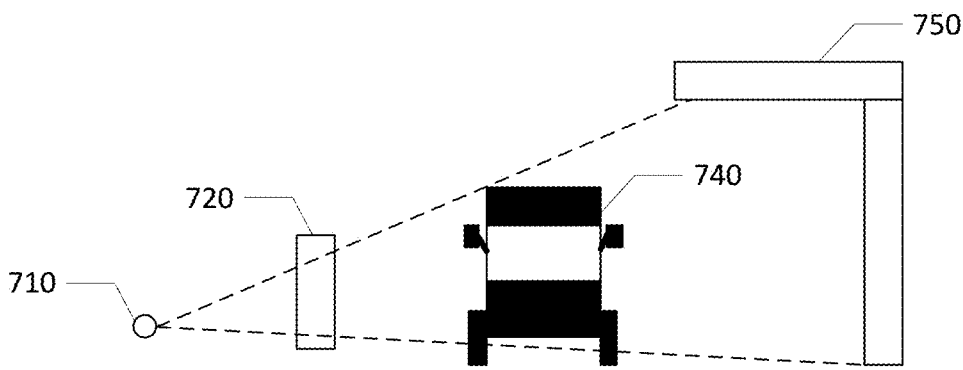

FIGS. 7A and 7B are structural diagrams of an inspection system according to an embodiment of the present disclosure. FIG. 7A illustrates a top view of the inspection system, and FIG. 7B illustrates a front view of the inspection system. As shown in FIGS. 7A and 7B, a ray source 710 generates X rays, which are collimated by a collimator 720 for security inspection on a moving container truck 740. Rays transmitted through the truck 740 are received by a detector 750, are converted into a digital signal, and are then processed by a data processing apparatus 760 such as a computer to acquire a transmitted image. According to an embodiment of the present disclosure, after the transmitted image of the container truck 740 is acquired through scanning, the data processing apparatus 760, such as a computer, is used to correct data of the detected energy spectrum in an iterative manner using a pre-calibrated detector response function, so as to acquire the reconstructed incident energy spectrum. A specific configuration of the data processing apparatus 760 is the same as that of the data processing apparatus 270, and the description thereof will not be repeated here. In addition, although the above description has been made to inspection of the container, those skilled in the art will appreciate other application scenarios such as a baggage inspection system, a CT inspection system, or a medical CT system etc.

Figure 8:
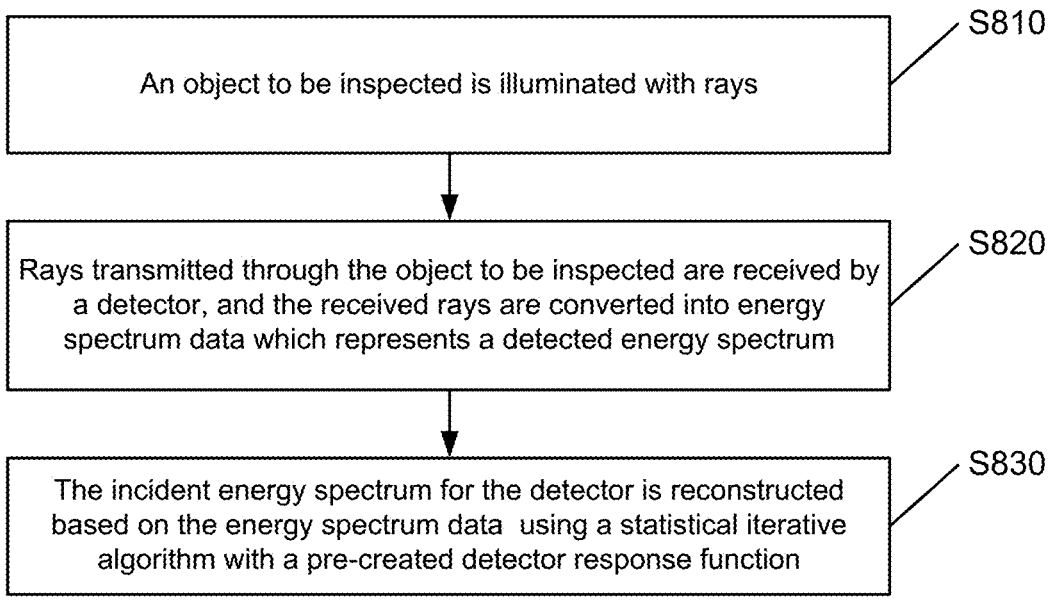
FIG. 8 is a schematic flowchart of a method for reconstructing an incident energy spectrum for a detector according to an embodiment of the present disclosure.

FIG. 8 is a schematic flowchart of a method for reconstructing an incident energy spectrum for a detector according to an embodiment of the present disclosure. As shown in FIG. 8, in step S810, the radiation source 710 generates X rays or gamma rays to illuminate an object 740 to be inspected.

In step S820, rays transmitted through the object to be inspected are received by the detector, and the received rays are converted into data of the detected energy spectrum by a data collection apparatus (not shown).

In step S830, the incident energy spectrum for the detector is reconstructed based on the data of the energy spectrum using a statistical iterative algorithm with a pre-created detector response function. Specifically, as the acquired spectrum is a discrete spectrum, the equation (1) may be written in a form of a matrix as follows:

$$D_i = \sum_j R_{ij} S_j \qquad (10)$$

wherein subscripts i and j represent discrete energy of the detected energy spectrum and discrete energy of the incident energy spectrum, respectively. If i and j are equal, a system matrix represented by a linear system of equations from the equation (10) is a full rank matrix. An analytic solution or a least square solution of the system of equations can be calculated directly in theory. However, due to the very morbidity of the system, even if a method of SVD singular value truncation or Tikhonov regularization is used, it is difficult to acquire an accurate solution.

In order to solve this problem, the method according to the present embodiment reduces the influence of the morbidity on the solution by reducing an error caused by a noise from the viewpoint of a noise model. In the equation (10), a discrete count $S_j$ of the incident optical spectrum is apparently subject to a Poisson distribution. From the nature of the Poisson distribution that a sum of variables with a Poisson distribution is also subjected to a Poisson distribution, it can be concluded that $D_i$ is also subjected to a Poisson distribution. A logarithmic likelihood function of the system may be written as:

$$\ln L(D, S) = \sum_{i=1} \left\{ -\sum_{j=1} R_{ij} S_j + D_i \ln\left(\sum_{j=1} R_{ij} S_j\right) - \ln D_i! \right\} \qquad (11)$$

According to the principle of statistical iterative reconstruction, an iterative equation may be written as:

$$S_j^{n+1} = \frac{S_j^n}{\sum_{i=1} R_{ij}} \sum_{i=1} \frac{R_{ij} D_i}{\sum_{k=1} R_{ik} S_k^n} \qquad (12)$$

wherein $D_i$ represents the data value, $R_{ij}$ is a matrix representation of the detector response function, $S_j$ represents the reconstructed energy spectrum incident onto the detector, and n is a number of iterations. In this way, S can be solved by iteration, and at the same time the influence of a Poisson noise on the solution in a high morbidity condition is reduced, which greatly improves the accuracy of the solution. S is an energy spectrum without distortion which is acquired through reconstruction.

Figure 9:
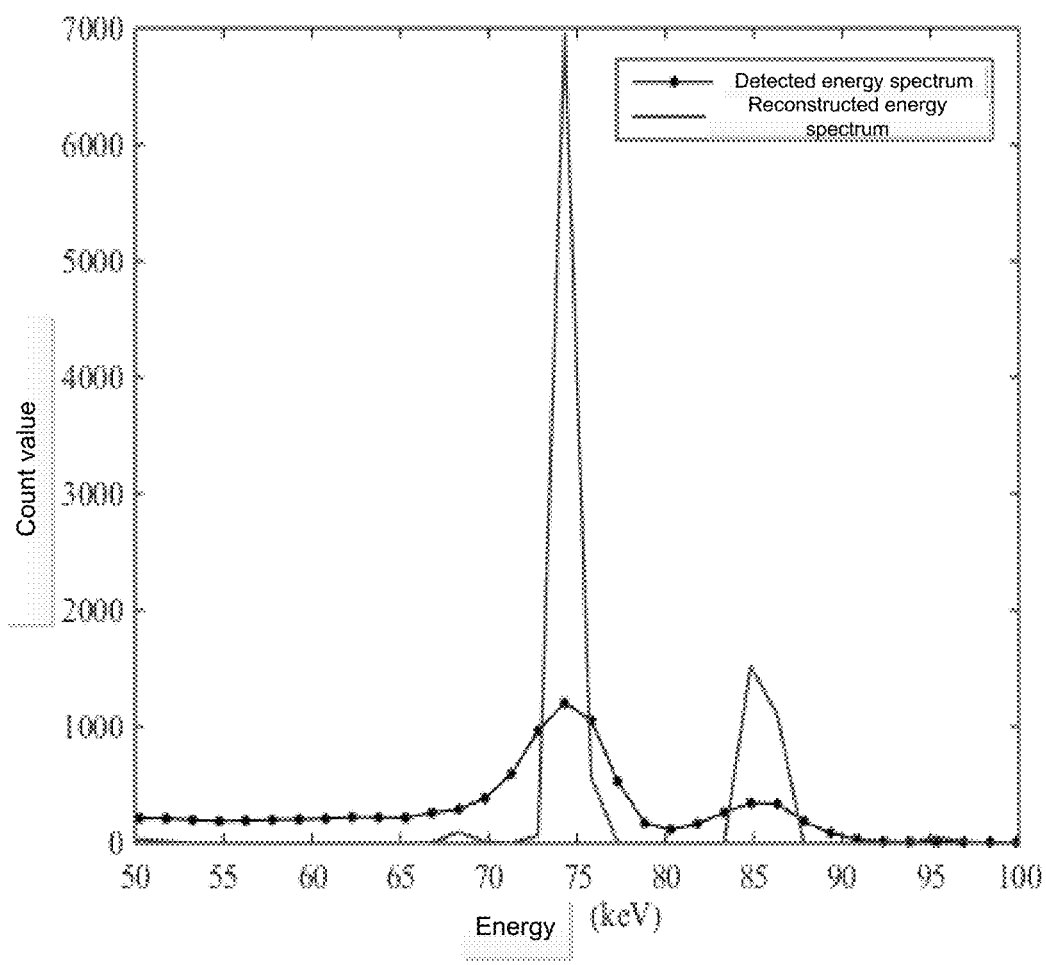
FIG. 9 is an exemplary graph illustrating a result of energy spectrum reconstruction according to an embodiment of the present disclosure.
Figure 10:
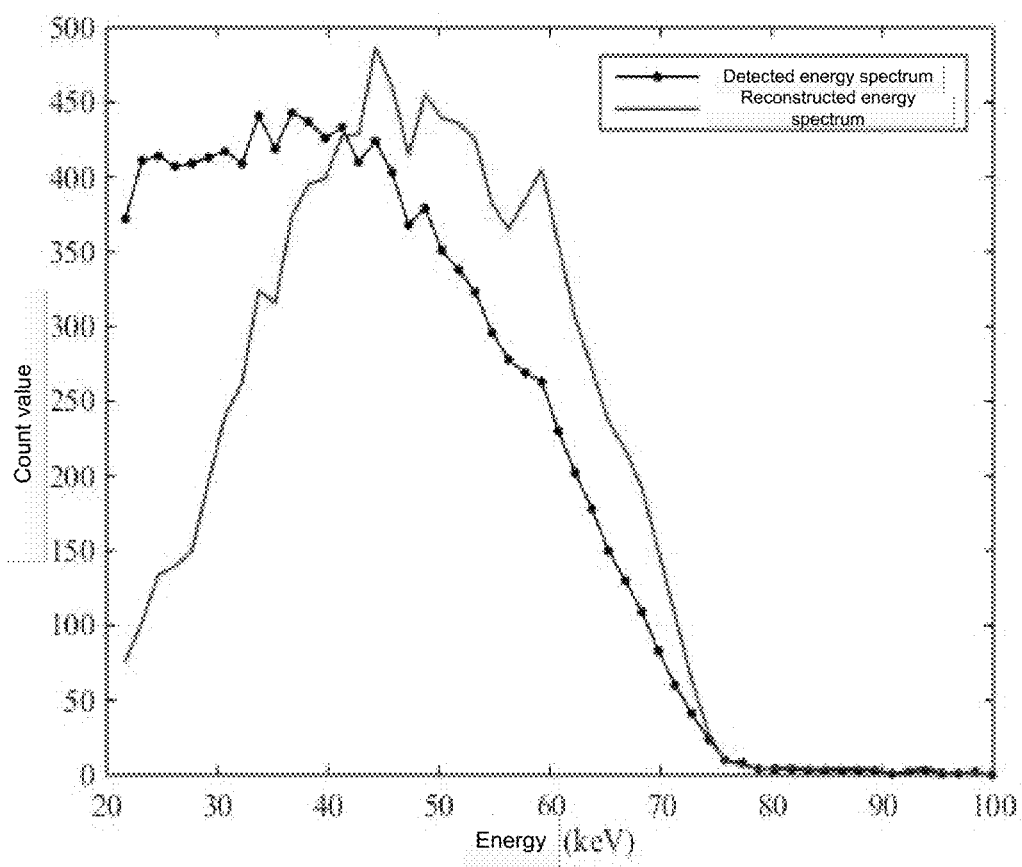
FIG. 10 is another exemplary graph illustrating a result of energy spectrum reconstruction according to an embodiment of the present disclosure.

FIG. 9 is an exemplary graph illustrating a result of energy spectrum reconstruction according to an embodiment of the present disclosure; and FIG. 10 is another exemplary graph illustrating a result of energy spectrum reconstruction according to an embodiment of the present disclosure. As shown in FIGS. 9 and 10, the method according to the embodiments of the present disclosure reconstructs an accurate incident energy spectrum according to the energy spectrum detected by the detector.

The method according to the embodiments of the present disclosure calibrates the function based on the relatively convenient XRF energy spectrum measurement by accurately modeling the XRF response, thereby conveniently acquiring the detector response equation. On the basis of the response equation, the statistical iterative algorithm is used to overcome the serious morbidity of energy spectrum reconstruction by analyzing the noise. The reconstructed energy spectrum eliminates the distortion phenomenon due to direct detection of the energy spectrum and can provide accurate energy spectrum measurements to applications which require energy spectrum information. The embodiments of the present disclosure can effectively improve the accuracy of the energy spectrum information by implementing fine-tuning on the parameters of the function to adapt to a plurality of detector systems, thereby improving the accuracy of the applications which depend on the energy spectrum information. Therefore, the present disclosure has a wide range of market application values in the fields of clinical medicine and security inspection.

In addition, with the aid of the XRF information collected by an energy spectrum detector, instead of implementing the Monte Carlo simulation on the detector and using a radioactive source or a synchronization radiation optical source which is not readily available, the technique of the embodiments can easily complete modeling and calibration of the detector response using only an X-ray machine and readily available several elementary materials. On the basis of the acquired detector response, the iterative algorithm overcomes the problem of serious morbidity in reconstructing the energy spectrum, and eliminates the serious distortion of the energy spectrum acquired by the detector. Compared with the existing method, the method according to the embodiments of the present disclosure greatly improves the practicality and accuracy of acquisition of an energy spectrum without distortion.

The foregoing detailed description has set forth various embodiments of the image display method and image registration method via the use of diagrams, flowcharts, and/or examples. In a case that such diagrams, flowcharts, and/or examples contain one or more functions and/or operations, it will be understood by those skilled in the art that each function and/or operation within such diagrams, flowcharts or examples may be implemented, individually and/or collectively, by a wide range of structures, hardware, software, firmware, or virtually any combination thereof. In one embodiment, several portions of the subject matter described in the embodiments of the present disclosure may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in ray of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the present disclosure has been described with reference to several typical embodiments, it is apparent to those skilled in the art that the terms are used for illustration and explanation purpose and not for limitation. The present disclosure may be practiced in various forms without departing from the spirit or essence of the present disclosure. It should be understood that the embodiments are not limited to any of the foregoing details, and shall be interpreted broadly within the spirit and scope as defined by the following claims. Therefore, all of modifications and alternatives falling within the scope of the claims or equivalents thereof are to be encompassed by the claims as attached.

We claim:

1. A method for reconstructing an incident energy spectrum for a detector, comprising steps of:
    illuminating an object to be inspected with rays;
    receiving, by the detector, rays transmitted through the object to be inspected to acquire data of a detected energy spectrum; and
    reconstructing the incident energy spectrum for the detector based on the data of the energy spectrum using a statistical iterative algorithm with a detector response function,
    wherein before the reconstructing step, the method further comprises calibrating parameters of the detector response function by collecting energy spectrums of X-ray fluorescence generated by different target materials in a plurality of energy segments, and
    wherein the detector response function further comprises a characteristic peak portion and an escape peak portion of the detector.

2. The method according to claim 1, wherein the detector response function comprises a Gaussian peak portion and a baseline portion which is a function of the Gaussian peak portion.

3. The method according to claim 2, wherein the detector response function is weighted using a weighting parameter which is fitted using a quadratic function and depends on energy of the detected energy spectrum.

4. The method according to claim 1, wherein the incident energy spectrum is iteratively reconstructed based on the following equation:

$$S_j^{n+1} = \frac{S_j^n}{\sum_{i=1} R_{ij}} \sum_{i=1} \frac{R_{ij} D_i}{\sum_{k=1} R_{ik} S_k^n},$$

wherein $D_i$ represents the data of the detected energy spectrum, $R_{ij}$ represents a matrix representation of the detector response function, $S_j$ represents the reconstructed incident energy spectrum for the detector, and n is a number of iterations.

5. The method according to claim 1, wherein the baseline portion is an integral of the Gaussian peak portion.

6. An apparatus for reconstructing an incident energy spectrum for a detector, comprising:
    a ray source configured to generate rays to illuminate an object to be inspected;
    a detector configured to receive rays transmitted through the object to be inspected to acquire data of a detected energy spectrum; and
    a data processing device configured to reconstruct the incident energy spectrum for the detector based on the data of the energy spectrum using a statistical iterative algorithm with a detector response function,
    wherein the data processing device is further configured to calibrate parameters of the detector response function by collecting energy spectrums of X-ray fluorescence generated by different target materials in a plurality of energy segments, and
    wherein the detector response function further comprises a characteristic peak portion and an escape peak portion of the detector.

7. The apparatus according to claim 6, wherein the detector response function comprises a Gaussian peak portion and a baseline portion which is a function of the Gaussian peak portion.

8. The apparatus according to claim 7, wherein the detector response function is weighted using a weighting parameter which is fitted using a quadratic function and depends on energy of the detected energy spectrum.

9. The apparatus according to claim 6, wherein the incident energy spectrum is iteratively reconstructed based on the following equation:

$$S_j^{n+1} = \frac{S_j^n}{\sum_{i=1} R_{ij}} \sum_{i=1} \frac{R_{ij} D_i}{\sum_{k=1} R_{ik} S_k^n},$$

wherein $D_i$ represents the data of the detected energy spectrum, $R_{ij}$ represents a matrix representation of the detector response function, $S_j$ represents the reconstructed incident energy spectrum for the detector, and n is a number of iterations.

* * * * *